(12) United States Patent
Herrich

(10) Patent No.: US 6,307,177 B1
(45) Date of Patent: Oct. 23, 2001

(54) METHOD AND DEVICE FOR DETERMINING THE VOLTAGE AT WELDING POWER SOURCES

(75) Inventor: Jörg Herrich, Augsburg (DE)

(73) Assignee: Kuka Schweissanlagen GmbH (DE)

( * ) Notice: Subject to any disclaimer, the term of this patent is extended or adjusted under 35 U.S.C. 154(b) by 0 days.

(21) Appl. No.: 09/402,607

(22) PCT Filed: Apr. 23, 1998

(86) PCT No.: PCT/EP98/02398

§ 371 Date: Oct. 22, 1999

§ 102(e) Date: Oct. 22, 1999

(87) PCT Pub. No.: WO98/48971

PCT Pub. Date: Nov. 5, 1998

(30) Foreign Application Priority Data

Apr. 25, 1997 (DE) ............................................... 197 17 462

(51) Int. Cl.[7] ..................................................... B23K 9/095
(52) U.S. Cl. ................... 219/130.31; 219/130.01
(58) Field of Search ......................... 219/130.31, 130.33, 219/130.51, 137.71

(56) References Cited

U.S. PATENT DOCUMENTS

| | | |
|---|---|---|
| 2,636,102 * | 4/1953 | Lobosco .......................... 219/137.71 |
| 3,725,636 | 4/1973 | Toth . |
| 4,301,355 * | 11/1981 | Kimbrough et al. ........... 219/130.31 |
| 4,620,082 * | 10/1986 | Graville et al. ................. 219/130.31 |
| 4,994,646 | 2/1991 | Tabata et al. . |
| 5,525,778 | 6/1996 | Matsui et al. . |

FOREIGN PATENT DOCUMENTS

| | | |
|---|---|---|
| 40 90 277 C2 | 4/1991 | (DE) . |
| 0 387 223 A1 | 9/1990 | (EP) . |
| 0 520 439 A2 | 12/1992 | (EP) . |
| 0 520 439 A3 | 12/1992 | (EP) . |

OTHER PUBLICATIONS

Hitachi Seiko K. K., Apr. 8, 1985, Power Source for Arc Welding, *Patent Abstracts of Japan*, Aug. 15, 1985, vol. 9/No. 1985.

* cited by examiner

*Primary Examiner*—Clifford C. Shaw
(74) *Attorney, Agent, or Firm*—McGlew and Tuttle, P.C.

(57) ABSTRACT

A process and a device are provided for determining the working voltage of welding current sources 25. The working voltage is determined partly outside the output terminals 23, 24 of the welding current source 25. The tap 2 is preferably performed on the wire electrode 16 or on the wire feed roller 17 of a wire electrode 16. The other tap 3, 4 may be performed on the workpiece 21, a workpiece connection 22 or on an output terminal 24 of the welding current source 25 or alternatively in the welding current source 25.

18 Claims, 7 Drawing Sheets

METHOD AND DEVICE FOR DETERMINING THE VOLTAGE AT WELDING POWER SOURCES

FIELD OF THE INVENTION

The present invention pertains to a process for determining the working voltage on a welding device with a controllable current source and to the welding device wherein the process uses a controllable welding cur-rent source, wire electrode wire feed means and a device for determining the working voltage on a welding current source.

BACKGROUND OF THE INVENTION

The reference J. Latimer, Automatic Welding, deals with the control of the arc length during submerged arc welding. A constant-current power source with usually larger wire diameters is used here, and slight changes in the amount of arc and thus in the arc voltage cause only a slight change in the current intensity. The arc length, which may change because of different effects, can be controlled by changing the electrode feed speed. The voltage is tapped for this purpose from the terminals of the current source or from the contact tube. The electrode feed speed is reduced when the arc length decreases and a corresponding voltage drop occurs, and, conversely, it is increased as the arc length increases. The welding current source is designed as a constant-current power source and is not controlled. U.S. Pat. No. 3,054,885 shows a system for monitoring a plurality of welding units by one operator. In the case of disturbance in one unit, this unit switches itself off and signals the failure to the monitoring operator, who is then to eliminate the disturbance. The monitoring is performed via various relays.

SUMMARY AND OBJECTS OF THE INVENTION

The primary object of the present invention is to determine the actual value of the working voltage better and more accurately.

According to the invention, a process is provided for determining the working voltage on a welding device with a controllable welding current source, a wire electrode, a wire feed means and a device for determining the working voltage on the welding current source. The measured working voltage is used to control the welding current source. The working voltage is determined at least partially outside the output terminals of the welding current source. One tap is provided at a spaced location before a point at which the current is introduced and directly on the wire electrode or on the wire feed roller of the wire electrode.

According to another aspect of the invention a device is provided with a welding current source, a wire electrode, a wire feed and the device for determining the working voltage on the welding current source. The welding current source has a controller and an output part. The taps are located at least partly outside the output terminals of the welding current source and are connected to the controller of the welding current source. One tap is arranged at a spaced location before a point at which the current is introduced and directly on the wire electrode or on the wire feed roller of the wire electrode.

The present invention offers the advantage that the measured voltage determined can be reduced essentially to the sum of the partial voltage drops over the arc and over the free end of the wire electrode, through which the welding current flows, wherein the partial voltage drops are relevant for the welding process proper and wherein the sum is necessary for the control of the welding current source. The voltage drop over the resistance of the wire electrode between one tap and the point at which the current is introduced is insignificant, because the measured current flowing over it is very low. Thus, essentially only the voltage drops over the useful resistances are used for controlling the welding current. The control is correspondingly accurate. Disturbance variables, which adversely affect the control and consequently the extrapolability, the comparability, the reproducibility, the process stability, and ultimately the quality of the weldings, are ruled out.

Due to the fact that the voltage over the useful resistances proper, the free end of a wire electrode and the arc can be controlled highly accurately in this manner, a constant welding process is obtained despite changing partial resistances in the welding circuit. Thus, even though the wear of the contact tube and welding lines with increasing temperature do cause increased partial resistances in the welding circuit, these do not affect the above-mentioned voltage drop over the useful resistances and consequently not the resulting arc length either.

Furthermore, the characteristic provided by the current source with the defined gradient is present on these useful resistances, and this characteristic is also available on the arc with slight deviations because of the small value of the partial resistances and consequently of the partial voltage drops over the free end of a wire electrode and the workpiece compared with the arc.

The reproducibility and the extrapolability are ensured, at least as far as the voltage is concerned, to a high extent with this method. This means that voltage values from data banks that were set up with this method of determining the actual value of the voltage can be applied to welding units without preliminary adjustment and they lead largely to the same welding result. Since the "drift of the welding parameters," especially concerning the voltage drop over the useful resistances and consequently above all the arc length, is more or less ruled out, the quality of the weldings meets the required criteria over longer periods of time than before. The intervals between changing the contact tubes can foreseeably also be considerably prolonged.

The invention may also use of existing taps on the workpiece or on the output terminal of the welding current source for the workpiece line or in the welding current source or on the workpiece. Furthermore, the intention provides for the possibilities of utilizing existing feed means and connection systems for torch hose bundles.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
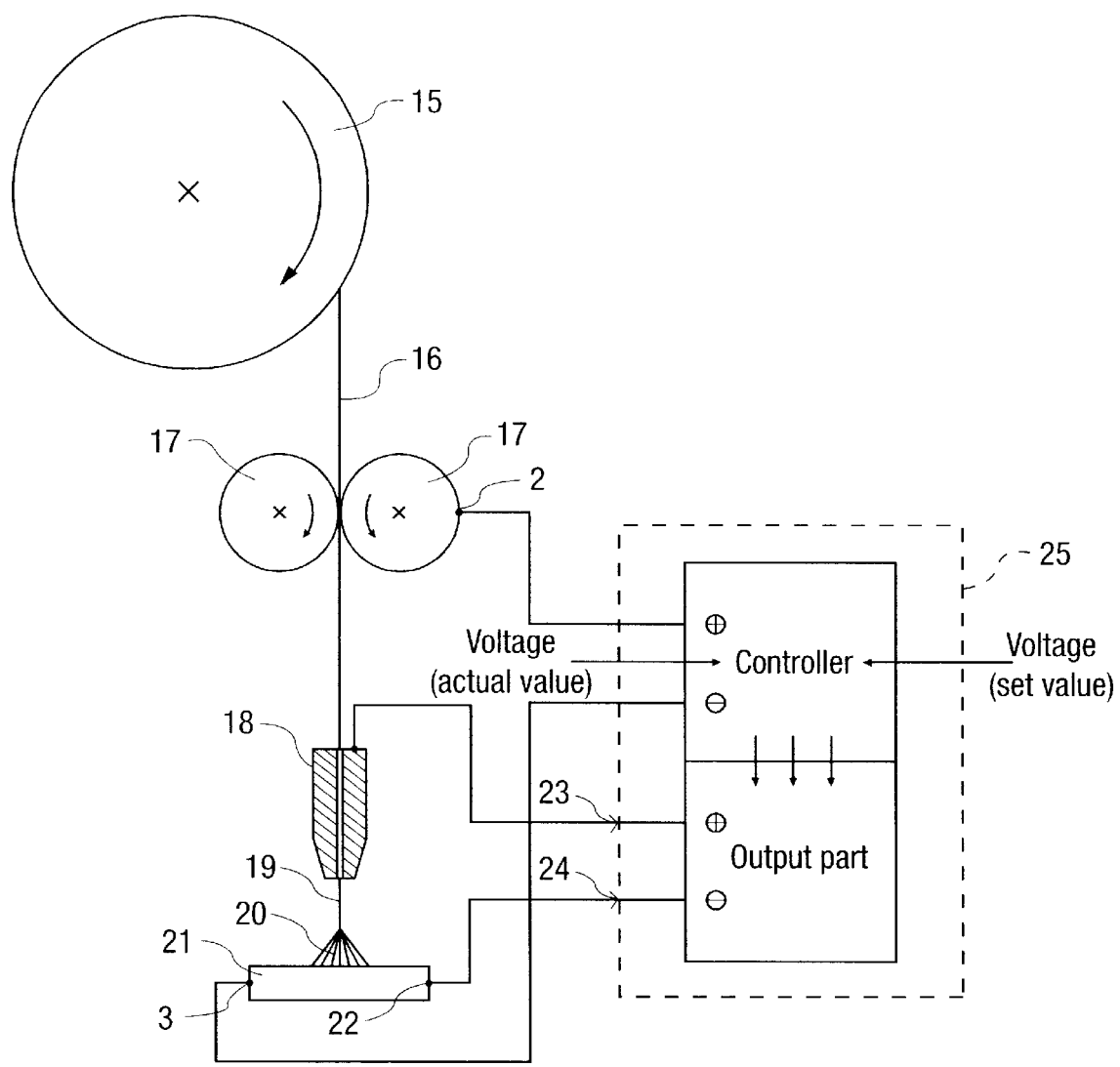
FIG. 1 is a schematic representation of the present invention.

The present invention is explained in a basic circuit diagram in FIG. 1. A controlled welding current source 25 is provided, which contains, in principle, a controller in the usual manner, which determines the actual values, compares them with the set points, and subsequently acts on an output part in order to thus make the actual values agree with the set points within the set tolerances. The welding current source 25 makes available a controlled working voltage on the output terminals 23, 24. The welding circuit extends, beginning from the output terminal 23, via lines and connection elements to a contact tube 18, which is to introduce the welding current into the wire electrode 16. The welding circuit further extends via the free end of a wire electrode 19, the so-called "stick-out," and the arc 20 to the workpiece 21, and from there to the other output terminal 24 of the welding current source 25 via the workpiece connection 22 and additional lines and connection elements.

The arc 20 develops from the free end of the wire electrode 19 to the workpiece 21 during the welding process. The working voltage is determined outside the output terminals 23, 24 of the welding current source 25 as the sum of the partial voltage drops over the arc 20, over the free end of the wire electrode 19, as well as over the workpiece 21, wherein the partial voltage drops are relevant for the welding process proper. The determination is performed between an electrically conductive tap 2 on the wire electrode 16 or on the wire feed roller 17 and a tap 3 on the workpiece 21. The tap 2 is present, e.g., at the support of the bearings of the wire feed rollers 17 of the wire electrode 16, wherein the electrical connection to at least one roller is ensured. Since the corresponding measured current is very low because of the very high internal resistance 13 of the voltage-measuring device present in the welding current source 25, the tap can be performed on the wire electrode 16 or on the wire feed roller 17 without damaging effects via the bearings.

Due to the generally low value of the resistance 8 of the workpiece 21, the voltage drop incorporated in the measured value is insignificant. The length of the torch hose bundle between the torch and the wire feed system may be very great in practice. The length of the wire electrode 16 between the measuring point, i.e., the tap 2 on the wire electrode 16 or on the wire feed roller 17 and the point at which the current is introduced into the contact tube 18 is thus correspondingly great as well. These considerable electrode lengths notwithstanding, the voltage drop over the resistance 14 of the wire electrode 16 between the measuring point 2 and the point at which the current is introduced into the contact tube 18 is insignificant, because the measured current flowing over it is very low. This is due to the very high internal resistance 13 of the voltage-measuring device in the welding current source 25, which is very high, in principle, in voltage-measuring devices.

In the case of the gas shielded metal arc welding, the wire electrode 16 is pushed according to FIG. 1 from a wire reserve 15, e.g., a coil, barrel or the like, through a contact tube 18 by means of wire feed rollers 17. It is advantageous in this case to determine the working voltage between a tap 2 directly on the wire electrode 16 or on the wire feed roller 17 of the wire electrode 16 and a tap 3 on the workpiece 21, especially for stationary units with a circuit according to FIG. 4.

Figure 2:
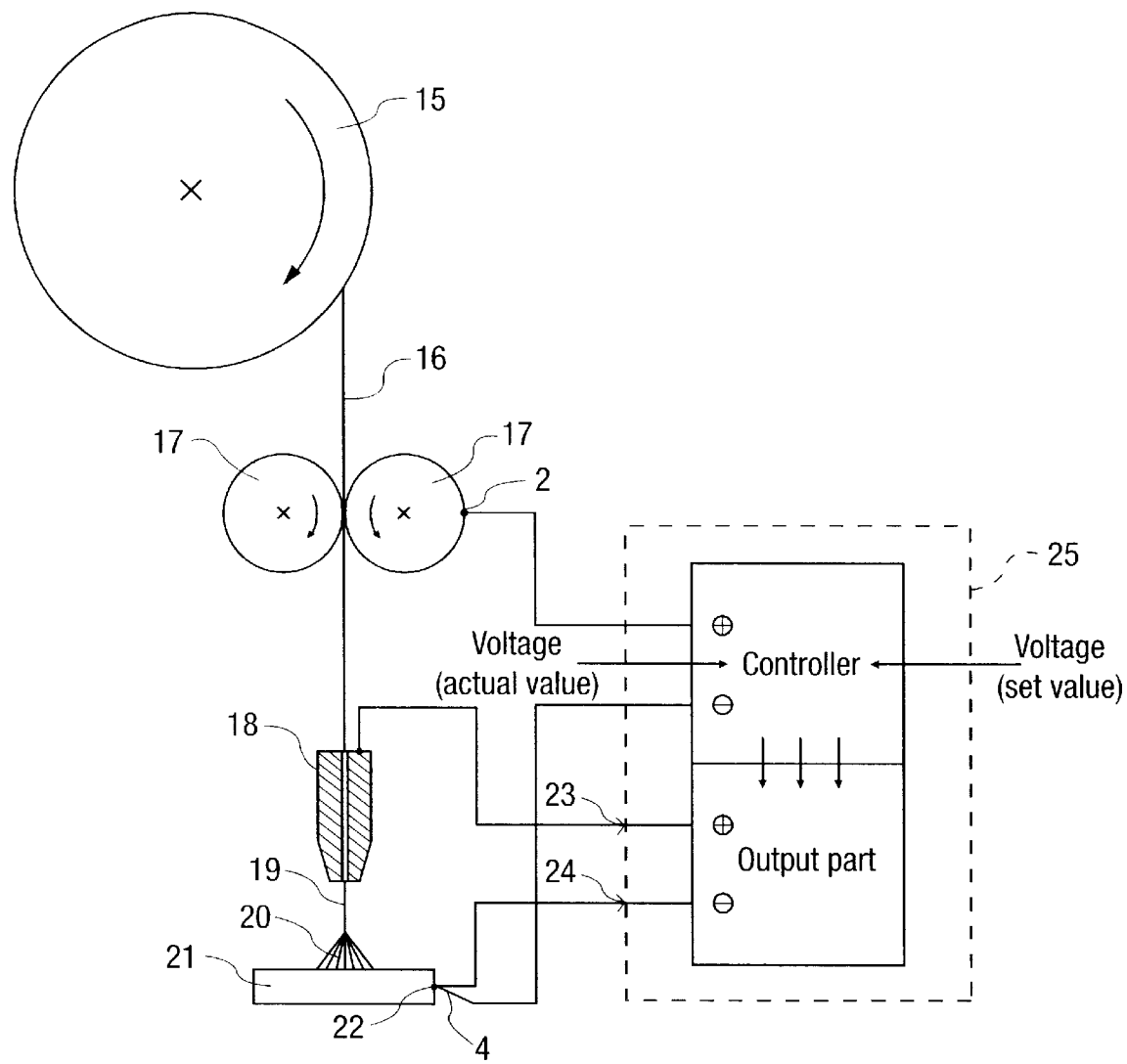
FIG. 2 is a schematic representation of a variant of the invention shown in FIG. 1.
Figure 3:
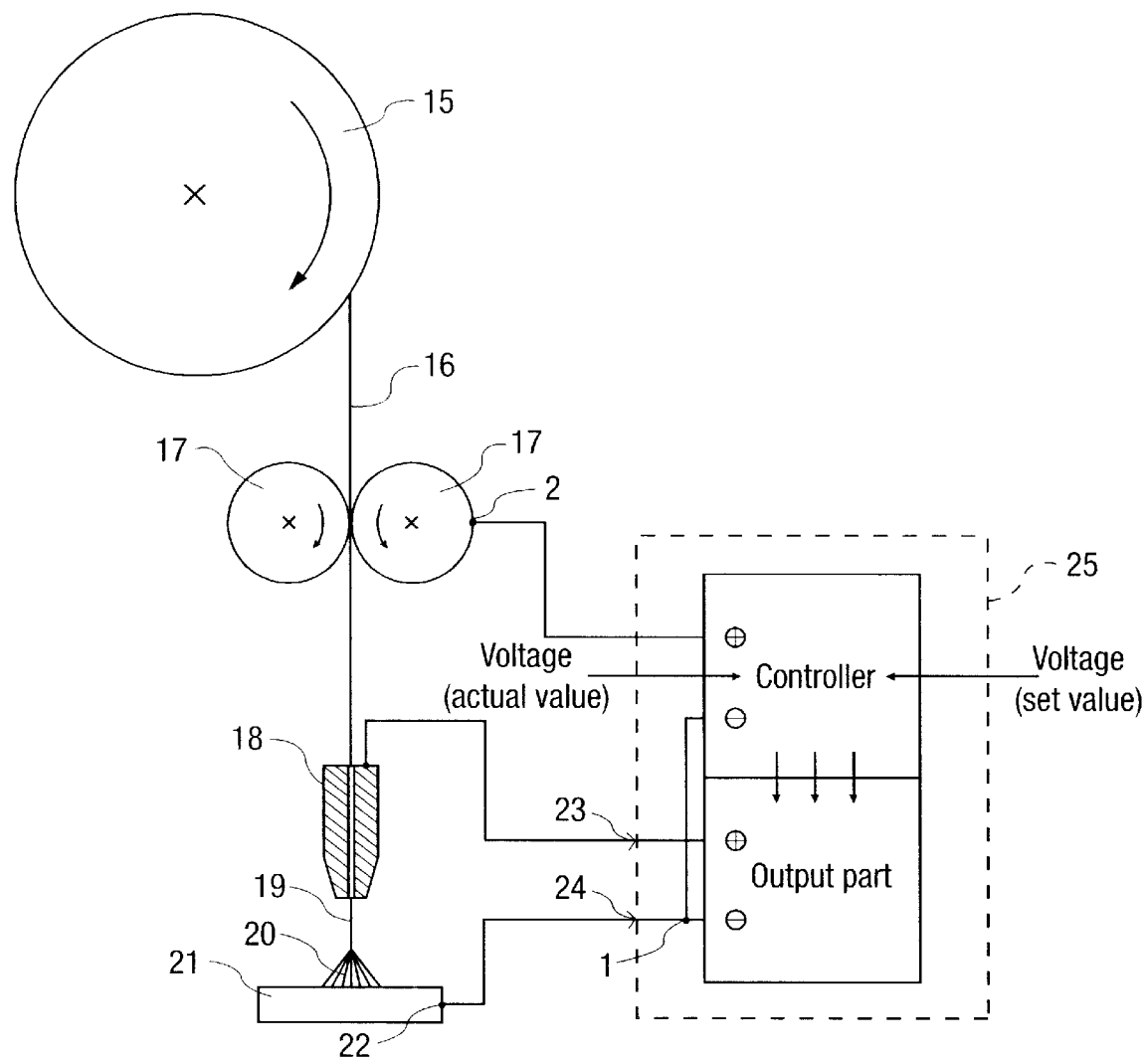
FIG. 3 is a schematic representation of another variant of the invention shown in FIGS. 1 and 2.

However, partial use of the suggestion according to the present invention is also possible according to FIG. 2 and FIG. 3. Additional resistances, e.g., the resistance 10 of the workpiece line, may affect the measured value in this case. This happens, e.g., in FIG. 3, when the working voltage is determined between the above-mentioned tap 2 and an existing tap 1, which is located on the output terminal 24 of the welding current source 25 or the workpiece line or inside the welding current source 25. A corresponding basic circuit diagram is shown in FIG. 6, and the internal resistance 12 of the welding current source 25 is also shown for illustration in all circuits according to FIGS. 4 through 6. It is advantageous that existing taps can be used and no additional measuring lines need to be laid, which would mean that more disturbance variables would have to be accepted.

Figure 5:
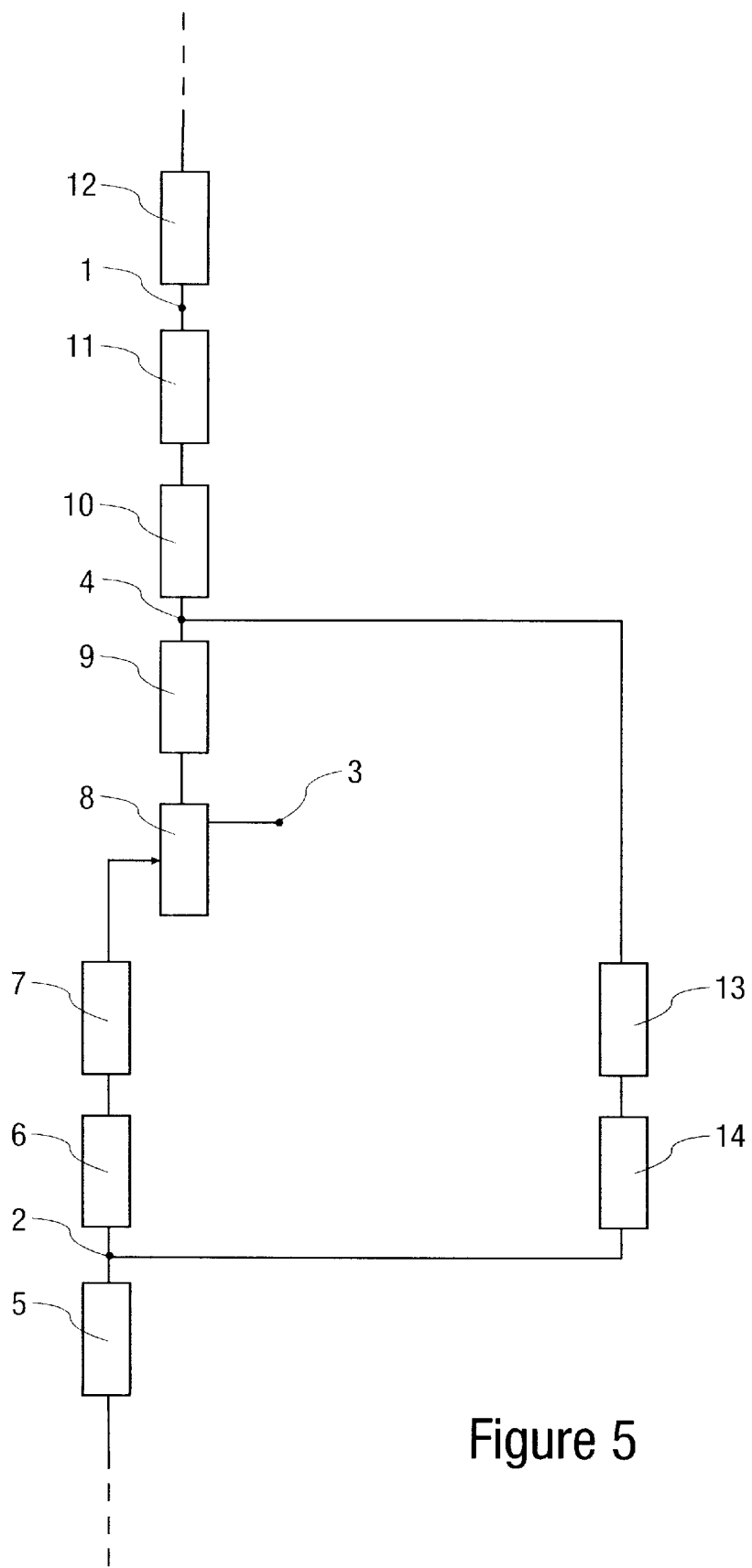
FIG. 5 is a basic circuit diagram for the embodiment in FIG. 2.
Figure 6:
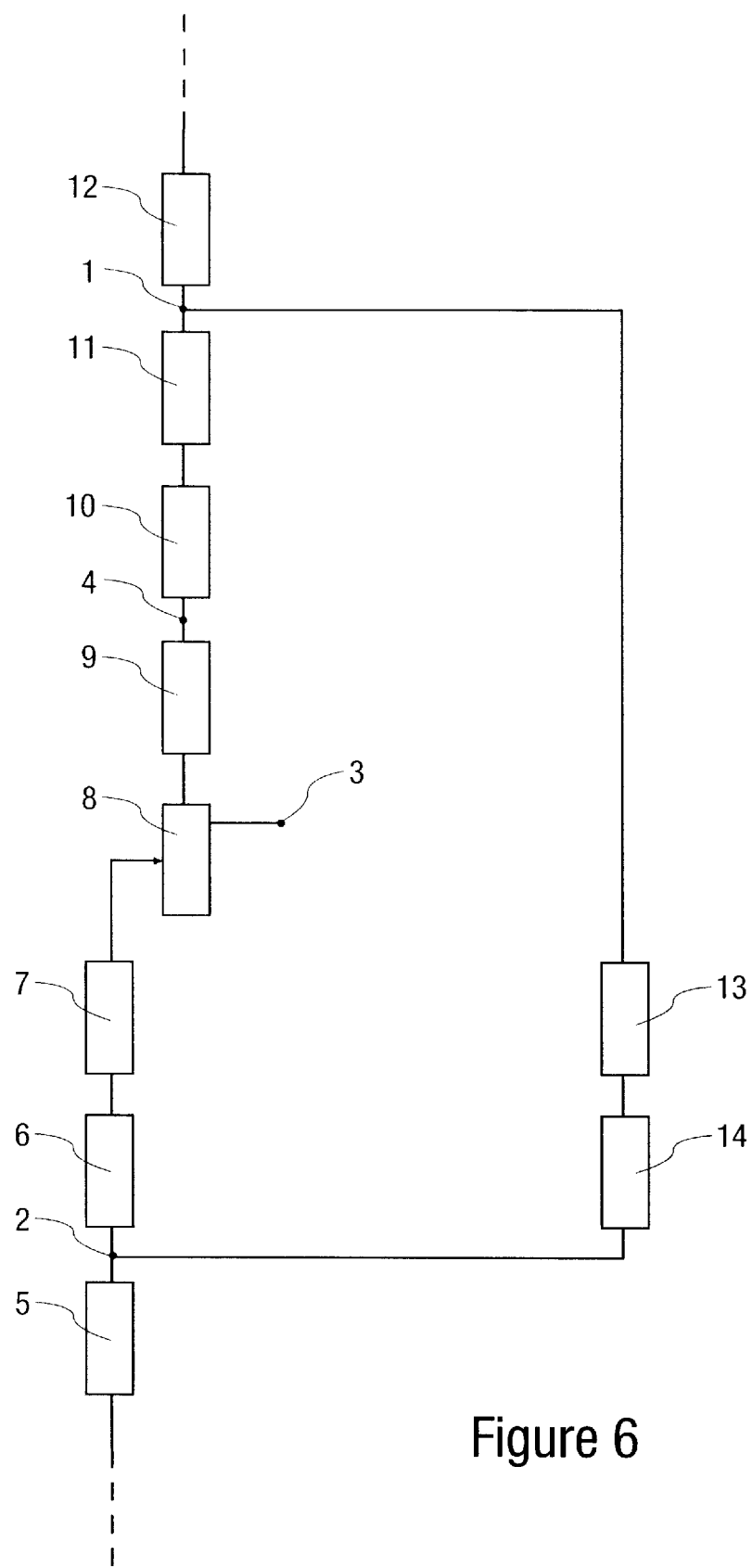
FIG. 6 is a basic circuit diagram for the embodiment in FIG. 3.

In a variant of the idea of including existing connection elements and taps, the tap 4 on the workpiece connection 22 is used according to FIGS. 2 and 5, and additional measuring lines are attached. Considerable loss resistances, e.g., the resistance 10 of the workpiece line, are now ruled out.

The integration of the measuring line for the tap 2 within the hose bundle between the welding current source 25 and the wire feed device is possible in all variants. No additional laying of lines is necessary for this.

Figure 4:
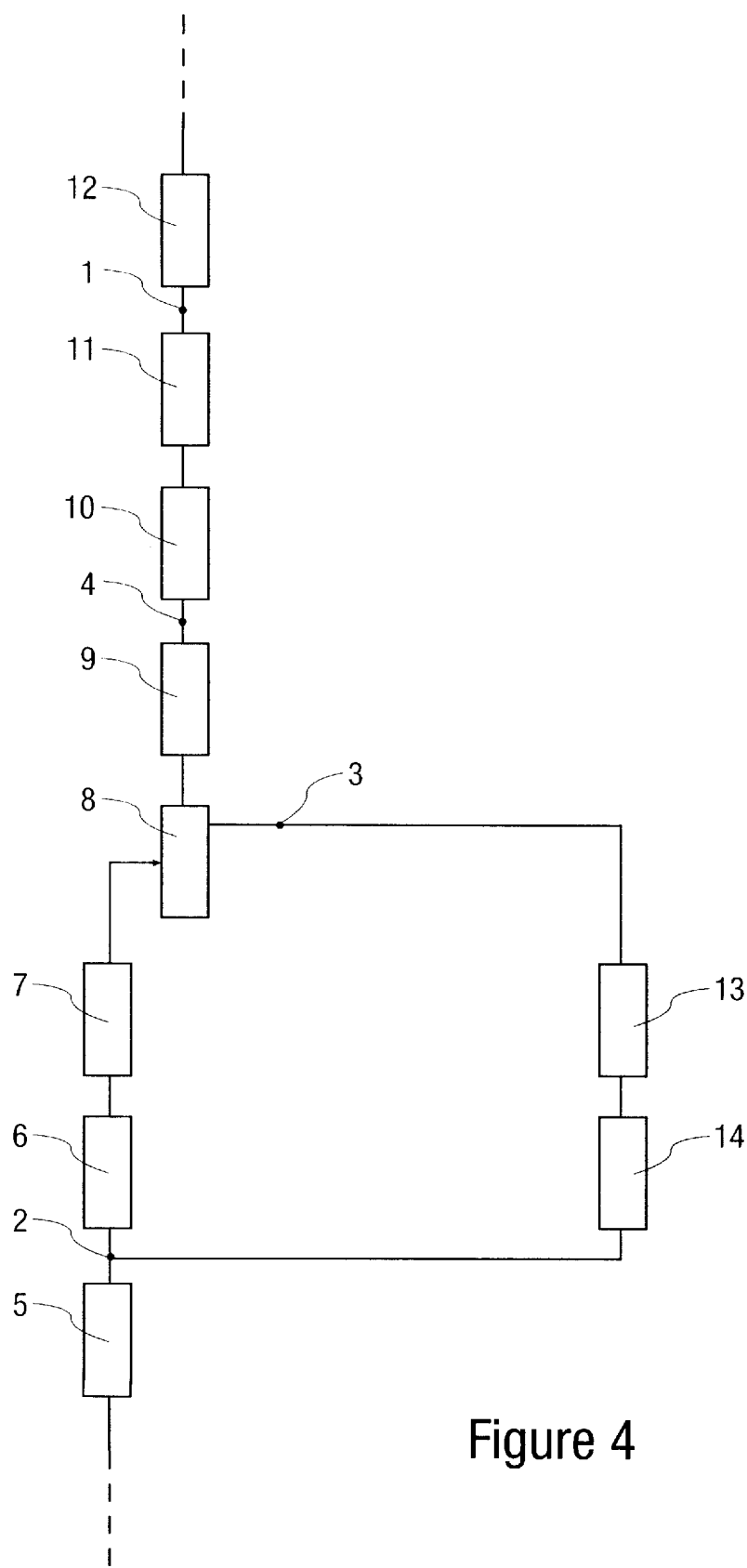
FIG. 4 is a basic circuit diagram for the embodiment in FIG. 1.

FIG. 4 shows a basic circuit diagram for determining the working voltage over resistances on welding current sources 25 through which the welding current flows, wherein the determination is performed outside the output terminals 23, 24 of the welding current source 25. Between a contact resistance 5 at the introduction of the welding current into the wire electrode 16 and a contact resistance 9 of a workpiece connection 22, a measured voltage is tapped over a resistance 6 of the free end 19 of the wire electrode 16, through which end the welding current flows, a resistance 7 of the arc 20 and a resistance 8 of the workpiece 21. The resulting measured current is very low because the internal resistance 13 of the voltage-measuring device in the welding current source 25 is, in principle, very high, and it does not cause a voltage drop that would be significant for the accuracy of the control.

FIG. 5 and FIG. 6 show basic circuit diagrams and equivalent circuit diagrams for the above-mentioned variants according to FIGS. 2 and 3, in which existing connection elements are used and measuring lines are partially eliminated. As in FIG. 4, the measured voltage is tapped over the resistance 6 of the free end 19 of the wire electrode 16, through which the welding current flows, the resistance 7 of the arc 20, and the resistance 8 of the workpiece 21. Furthermore, it is possible according to FIG. 5 to additionally tap the measured voltage over a contact resistance 9 of the workpiece connection 22. This tap is also conceivable on a welding device that also has the task of introducing the welding current into the part to be welded, besides fixing the parts.

It is also possible according to FIG. 6 to tap the measured voltage over the above-mentioned resistances 6, 7, 8, 9 and a resistance 10 of the workpiece line as well as a contact resistance 11 of the connection elements of the workpiece line on the welding current source (25), and the latter tap I takes place on the output terminal 24 of the welding current source 25 or in its inside.

Even the variant according to FIG. 6 offers decisive advantages over the prior-art method. Thus, considerable lengths of welding lines are excluded from the measurement, as before. However, disturbance variables, such as the variable current introduction into the contact tube because of wear and the resulting variable loss resistance, are excluded, in particular.

To use the present invention in practice, a device is proposed that has a contact tube 18 for transmitting the welding current to the wire electrode 16, wherein the wire electrode 16 has no additional electric connections to the potential of the welding circuit. The wire feed system is electrically insulated against the welding circuit. The measured voltage is determined via a tap 2 directly on the wire electrode 16 or on the wire feed roller 17 of the insulated wire feed system and a tap 3 on the workpiece.

Figure 7:
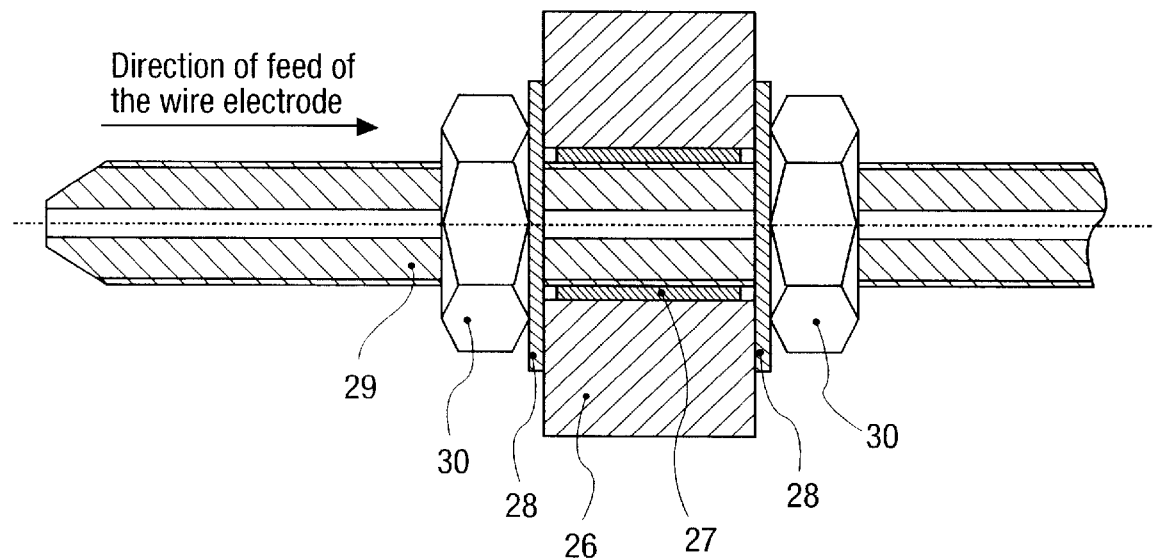
FIG. 7 is a galvanic separation of the wire feed and the central connection.

FIG. 7 shows an advantageous embodiment of this device with a central feed for a torch hose bundle and with a direct electrical connection of a feed means to the potential of the welding circuit, aside from the connection via the wire electrode. A support plate 26 is provided in the case of the central feed for wire feed rollers 17, their bearings or the like. This has an enlarged hole and is equipped with an inserted, electrically insulating bushing 27 and bilateral, electrically insulating washers 28. Usual hexagon nuts 30 are used for fastening. This ensures galvanic separation of a wire inlet section 29 in the torch hose bundle against the feed means.

In another advantageous embodiment of the device with central connection for a torch hose bundle, which is at the same time part of the welding circuit, a plastic tube is used to guide the wire electrode 16. The plastic tube electrically insulate the wire electrode 16, with the exception of the contacting in the contact tube 18, against the welding circuit and with the exception of the contacting during the determination of the voltage over the tap 2 on the wire electrode 16 or on the wire feed roller 17. A contact tube 18 is used to transmit the welding current to the wire electrode 16 in this case as well, and the wire electrode 16 has no additional electric connections to the potential of the welding circuit. The measured voltage is determined via the tap 2 on the wire electrode 16 or the wire feed roller 17 of the wire feed system, which is electrically insulated against the welding circuit, and a tap 1, 3, 4 according to FIGS. 1, 2 or 3 and 4, S or 6.

In another embodiment, a prior-art, separate connection terminal is used on the wire feed device and on the welding line in the torch hose bundle, and the welding current is transmitted from this line to the contact tube 18 and farther to the wire electrode 16, and, unlike in the case of the central connection, this line has no additional direct or indirect electric connections with the wire electrode 16.

The above-mentioned conditions of the electrical insulation of the wire feed device against the welding circuit are correspondingly satisfied in the case of additional wire feed devices as well, which are used in long hose bundles or in torches. In addition, the determination of the voltage according to the present invention over the tap 2 on the wire electrode 16 or on the wire feed roller 17 can also be performed on one of these additional wire feed devices.

The measuring lines used to embody the present invention to determine the actual value of the welding voltage should be shielded. The shielding should likewise be connected to the housing of the welding current source in order to avoid disturbances.

While specific embodiments of the invention have been shown and described in detail to illustrate the application of the principles of the invention, it will be understood that the invention may be embodied otherwise without departing from such principles.

What is claimed is:

1. A process for determining the working voltage on a welding device having a controllable welding current source, a wire electrode, a wire feed having a wire feed direction and a device for determining the working voltage associated with the welding current source, the process comprising:

introducing current to the wire electrode at welding current source output terminals, defining current introduction locations;

determining the working voltage by measuring voltage at least at one location partly outside the introducing locations of the output terminals of the welding current source, including providing one tap at a spaced location upstream from the current introduction locations with respect to the wire feed direction, the one tap being provided one of directly in contact with the wire electrode or in contact with the wire feed roller of the wire electrode.

2. The process in accordance with claim 1, wherein said working voltage is measured essentially as the sum of the partial voltage drops over an arc, over a free end of the wire electrode, through which the welding current flows, and the section up to the tap of the wire electrode, and over a resistance of a workpiece, wherein partial voltage drops are considered for controlling the welding process proper.

3. The process in accordance with claim 1, wherein the voltage drop affecting the measured value due to the resistance of a workpiece is ignored for controlling the welding process.

4. the process in accordance with claim 1, wherein a second tap is provided on a workpiece.

5. The process in accordance with claim 1, wherein a second tap is provided on an output terminal of the welding current source or in the welding current source.

6. The process in accordance with claim 1, wherein a second tap is provided on a workpiece connection.

7. The process in accordance with claim 1, wherein the working voltage is determined during gas shielded metal arc welding.

8. A welding device comprising:

a welding current source with a current source controller and with output terminals;

a wire electrode;

a wire feed for feeding said wire electrode in a feed direction, one of said terminals being in electrical contact with said electrode;

a device for determining the working voltage drop; and taps located connected to said current source controller of the said welding current source, one of said taps being arranged upstream with respect to said feed direction, at a spaced location from said one of said terminals said one of said taps being either directly in contact with said wire electrode or being in contact with said wire feed roller.

9. The welding device in accordance with claim 8, further comprising a workpiece with a workpiece connection wherein another of said taps is arranged on said workpiece or on a workpiece connection and another of said terminals is connected to said workpiece.

10. The welding device in accordance with claim 8, wherein another of said taps is arranged on an output terminal of said welding current source or in said welding current source.

11. The welding device in accordance with claim 8, further comprising a contact tube in electrical contact with said wire electrode for introducing welding current into the wire electrode, said one of said terminals being connected to said contact tube.

12. The welding device in accordance with claim 11, wherein said wire electrode has no additional electric connections to the potential of the welding circuit.

13. The welding device in accordance with claim 8, wherein said wire feed system is electrically insulated from the welding circuit with the exception of said tap on said wire feed roller.

14. The welding device in accordance with claim 8, wherein a central connection is provided for a hose bundle, wherein the wire feed has an electrical connection to the potential of the welding circuit via the wire electrode.

15. The welding device in accordance with claim 14, wherein a central connection includes a support plate provided for galvanic separation of said wire feed rollers or a bearing of the wire feed roller from a wire inlet section entering a hose bundle.

16. The welding device in accordance with claim 14, further comprising a contact tube in electrical contact with said wire electrode for introducing welding current into the wire electrode, said one of said terminals being connected to said contact tube wherein the central connection has a plastic tube for guiding the wire electrode, said plastic tube electrically insulating the wire electrode from the welding circuit with the exception of the contacting in a contact tube and with the exception of the contacting at said tap on said wire electrode or on said wire feed roller.

17. The welding device in accordance with one of the claim 8, wherein a separate output terminal is provided on the wire feed device and the welding line in a hose bundle, wherein the welding current is transmitted from this line to a contact tube and farther to said wire electrode, and this line has no additional direct or indirect electric connections to said wire electrode.

18. A welding device comprising:

a welding current source with a current source controller and with output terminals;

a wire electrode;

a wire feed for feeding said wire electrode in a feed direction;

a contact tube in electrical contact with said wire electrode for introducing welding current into the wire electrode, said one of said terminals being connected to said contact tube, one of said terminals being in electrical contact with said electrode;

a workpiece, another of said terminals being in electrical connection with said workpiece; and a first voltage sensing tap connected to said current source controller of the said welding current source and a second voltage sensing tap connected to said current source controller of the said welding current source, said first tap being arranged upstream with respect to said feed direction, at a spaced location from said one of said terminals said first tap being either directly in electrical contact with said wire electrode or being in electrical contact with said wire feed roller, said second tap being in electrical contact with said workpiece.

* * * * *